(12) United States Patent
Kishizoe

(10) Patent No.: US 10,850,574 B2
(45) Date of Patent: Dec. 1, 2020

(54) PNEUMATIC TIRE

(71) Applicant: The Yokohama Rubber Co., LTD., Tokyo (JP)

(72) Inventor: Isamu Kishizoe, Hiratsuka (JP)

(73) Assignee: The Yokohama Rubber Co., LTD.

( * ) Notice: Subject to any disclaimer, the term of this patent is extended or adjusted under 35 U.S.C. 154(b) by 736 days.

(21) Appl. No.: 15/507,727

(22) PCT Filed: Aug. 28, 2015

(86) PCT No.: PCT/JP2015/074433
§ 371 (c)(1),
(2) Date: Feb. 28, 2017

(87) PCT Pub. No.: WO2016/035708
PCT Pub. Date: Mar. 10, 2016

(65) Prior Publication Data
US 2017/0291460 A1 Oct. 12, 2017

(30) Foreign Application Priority Data
Sep. 5, 2014 (JP) .................................. 2014-181061

(51) Int. Cl.
*B60C 19/08* (2006.01)
*B60C 11/00* (2006.01)

(52) U.S. Cl.
CPC ............ *B60C 19/08* (2013.01); *B60C 19/082* (2013.01); *B60C 19/088* (2013.01); *B60C 2011/0025* (2013.01); *Y02T 10/862* (2013.01)

(58) Field of Classification Search
CPC ...... B60C 19/08; B60C 19/082; B60C 19/088
See application file for complete search history.

(56) References Cited

U.S. PATENT DOCUMENTS 9,333,812 B2 * 5/2016 Nagai ................... B60C 19/082
9,676,237 B2 * 6/2017 Mafune ................ B60C 19/082
(Continued)

FOREIGN PATENT DOCUMENTS

JP   H11-170814      6/1999
JP   2004268863 A  * 9/2004
(Continued)

OTHER PUBLICATIONS

English machine translation of JP 2004-268863 A, Sep. 30, 2004.*
(Continued)

*Primary Examiner* — Adrienne C. Johnstone
(74) *Attorney, Agent, or Firm* — Thorpe North & Western

(57) ABSTRACT

A pneumatic tire includes: a rim cushion rubber disposed in a bead portion where the bead portion and a rim are in contact with each other; an electrically conductive rubber disposed in the rim cushion rubber, the electrically conductive rubber having an electrical resistance value lower than that of the rim cushion rubber, and including a first end exposed on an outer surface of the rim cushion rubber in contact with the rim, and a second end disposed in contact with a tire component adjacent to the rim cushion rubber; and an ground tread rubber disposed in a tread portion passing through a cap tread rubber and an undertread rubber of the tread portion, the ground tread rubber having an electrical resistance value lower than that of the cap tread rubber.

4 Claims, 15 Drawing Sheets

(56) References Cited

U.S. PATENT DOCUMENTS

| | | | |
|---|---|---|---|
| 10,189,318 B2* | 1/2019 | Kishizoe | B60C 19/082 |
| 2010/0243115 A1 | 9/2010 | Wada | |
| 2012/0234448 A1 | 9/2012 | Asayama | |
| 2016/0121665 A1* | 5/2016 | Moldenhauer | B60C 19/088 |
| | | | 152/152.1 |

FOREIGN PATENT DOCUMENTS

| | | |
|---|---|---|
| JP | 2004-276686 | 10/2004 |
| JP | 2005-028999 | 2/2005 |
| JP | 2009-023504 | 2/2009 |
| JP | 2009-113597 | 5/2009 |
| JP | 2012-192876 | 10/2012 |
| WO | WO 2009/060647 | 5/2009 |
| WO | WO-2015/003825 A1 * | 1/2015 |

OTHER PUBLICATIONS

English machine translation of JP 11-170814 A, Jun. 29, 1999.*
English machine translation of JP 2005-28999 A, Feb. 3, 2005.*
International Search Report for International Application No. PCT/JP2015/074433 dated Nov. 17, 2015, 4 pages, Japan.

* cited by examiner

| | CONVENTIONAL EXAMPLE | COMPARATIVE EXAMPLE | WORKING EXAMPLE 1 | WORKING EXAMPLE 2 | WORKING EXAMPLE 3 | WORKING EXAMPLE 4 | WORKING EXAMPLE 5 | WORKING EXAMPLE 6 | WORKING EXAMPLE 7 | WORKING EXAMPLE 8 |
|---|---|---|---|---|---|---|---|---|---|---|
| ELECTRICALLY CONDUCTIVE RUBBER | ABSENT | ABSENT | PRESENT | PRESENT | PRESENT | PRESENT | PRESENT | PRESENT | PRESENT | PRESENT |
| EARTH TREAD RUBBER | ABSENT | PRESENT | PRESENT | PRESENT | PRESENT | PRESENT | PRESENT | PRESENT | PRESENT | PRESENT |
| EARTH TREAD RUBBER FIRST END < SECOND END | - | SAME | YES | YES | YES | YES | YES | YES | YES | YES |
| ELECTRICALLY CONDUCTIVE RUBBER ELECTRICAL RESISTANCE VALUE (Ω) | - | - | $10^7$ | $10^7$ | $10^7$ | $10^7$ | $10^7$ | $10^7$ | $10^6$ | $10^5$ |
| RIM CUSHION RUBBER ELECTRICAL RESISTANCE VALUE (Ω) | $10^5$ | $10^8$ | $10^8$ | $10^8$ | $10^8$ | $10^8$ | $10^8$ | $10^8$ | $10^8$ | $10^8$ |
| EARTH TREAD RUBBER ELECTRICAL RESISTANCE VALUE (Ω) | - | - | $10^7$ | $10^7$ | $10^7$ | $10^7$ | $10^7$ | $10^7$ | $10^6$ | $10^5$ |
| CAP TREAD tan δ | 0.15 | 0.15 | 0.15 | 0.20 | 0.25 | 0.25 | 0.25 | 0.25 | 0.25 | 0.25 |
| UNDERTREAD tan δ | 0.15 | 0.15 | 0.15 | 0.20 | 0.15 | 0.15 | 0.15 | 0.15 | 0.15 | 0.15 |
| tan δ (EARTH TREAD RUBBER < ELECTRICALLY CONDUCTIVE RUBBER) | - | - | SAME | SAME | SAME | YES | YES | YES | YES | YES |
| CB VOLUME FRACTION × DBP OIL ABSORPTION NUMBER/100 (EARTH TREAD RUBBER < ELECTRICALLY CONDUCTIVE RUBBER) | - | - | SAME | SAME | SAME | SAME | YES | YES | YES | YES |
| EARTH TREAD RUBBER POSITION STARTING AT TIRE EQUATORIAL PLANE WITH RESPECT TO GROUND CONTACT WIDTH (%) | - | 50.00 | 50.00 | 50.00 | 50.00 | 50.00 | 50.00 | 20.00 | 20.00 | 20.00 |
| TIRE ELECTRICAL RESISTANCE VALUE (Ω) | $8 \times 10^5$ | $7 \times 10^8$ | $7 \times 10^7$ | $7 \times 10^7$ | $7 \times 10^7$ | $4 \times 10^7$ | $3 \times 10^7$ | $1 \times 10^7$ | $1 \times 10^6$ | $3 \times 10^5$ |
| ROLLING RESISTANCE REDUCTION PERFORMANCE | 100 | 105 | 105 | 105 | 105 | 105 | 105 | 105 | 105 | 105 |
| HIGH-SPEED DURABILITY PERFORMANCE | 100 | 105 | 105 | 105 | 110 | 110 | 110 | 110 | 110 | 110 |
| STEERING STABILITY PERFORMANCE ON WET ROAD SURFACES | 100 | 100 | 100 | 105 | 110 | 110 | 110 | 110 | 110 | 110 |

FIG. 21

PNEUMATIC TIRE

TECHNICAL FIELD

This technology relates to a pneumatic tire capable of achieving good rolling resistance reduction performance, high-speed durability performance, and electrical resistance reduction performance in a compatible manner.

BACKGROUND ART

An example of a conventional pneumatic tire is described in Japanese Unexamined Patent Application Publication No. 2009-023504A. The pneumatic tire includes a tread portion, a sidewall portion, a bead portion, a carcass extending from the tread portion to the bead portion through the sidewall portion, and a breaker disposed at an outside of the carcass in a tire radial direction, wherein each of a tread rubber, a breaker rubber, and a sidewall rubber formed on the tread portion, the breaker, and the sidewall portion, respectively, has a volume resistivity of $1\times10^8$ Ω·cm or greater. The pneumatic tire further includes an electrically conductive rubber disposed between a carcass ply forming the carcass and the sidewall rubber and between the breaker and the tread portion and having a thickness of from 0.2 mm to 3.0 mm, an electrically conducting rubber contacting the electrically conductive rubber and embedded in the tread portion so as to be partially exposed on a surface of the tread portion, and a clinch connected to a lower end of the electrically conductive rubber and disposed in a region of the bead portion in contact with a rim flange. The electrically conductive rubber, the electrically conducting rubber and a clinch rubber has a volume resistivity of less than $1\times10^8$ Ω·cm.

Japanese Unexamined Patent Application Publication No. 2009-023504A describes a pneumatic tire for discharging static electricity generated when the pneumatic tire runs on a road surface while keeping the rolling resistance of the tire low. The pneumatic tire of Japanese Unexamined Patent Application Publication No. 2009-023504A includes an electrically conductive rubber disposed between a carcass ply forming the carcass and the sidewall rubber and between the breaker and the tread portion and having a thickness of from 0.2 mm to 3.0 mm, and a clinch connected to a lower end of the electrically conductive rubber and disposed in a region of the bead portion in contact with a rim flange. The electrically conductive rubber and the clinch have a volume resistivity of less than $1\times10^8$ Ω·cm. In other words, in the pneumatic tire of Japanese Unexamined Patent Application Publication No. 2009-023504A, the electrically conductive rubber disposed between the carcass ply and the sidewall rubber and between the breaker and the tread portion, and clinch rubber disposed in the region of the bead portion in contact with the rim flange are made of rubber material with low electrical resistance. As a result, the rubber material with low electrical resistance has high heat build-up, so it tends to reduce rolling resistance reduction performance and high-speed durability performance.

SUMMARY

The present technology provides a pneumatic tire capable of achieving good rolling resistance reduction performance, high-speed durability performance, and electrical resistance reduction performance in a compatible manner.

A first aspect of the present technology is a pneumatic tire including:

a rim cushion rubber disposed in a bead portion where the bead portion and a rim are in contact with each other;

an electrically conductive rubber disposed in the rim cushion rubber, the electrically conductive rubber having an electrical resistance value lower than that of the rim cushion rubber, and including a first end exposed on an outer surface of the rim cushion rubber in contact with the rim, and a second end disposed in contact with a tire component adjacent to the rim cushion rubber; and an ground tread rubber disposed in a tread portion passing through a cap tread rubber and an undertread rubber of the tread portion, the ground tread rubber having an electrical resistance value lower than that of the cap tread rubber, and including a first end exposed on a tread surface, and a second end disposed in contact with a belt layer or a belt reinforcing layer, in a meridian cross-section, a width of the second end in a thickness direction being greater than a width of the first end.

According to this pneumatic tire, by including the electrically conductive rubber with a lower electrical resistance value than that of the rim cushion rubber, electricity that enters from the rim flows toward the tread portion through the electrically conductive rubber and the tire component. Because of this, a low heat build-up rubber can be used without taking into consideration the electrical resistance value of the rim cushion rubber, and thus rolling resistance reduction performance and high-speed durability performance can be improved. As a result, good rolling resistance reduction performance, high-speed durability performance, and electrical resistance reduction performance can be achieved in a compatible manner.

Furthermore, according to this pneumatic tire, by including the ground tread rubber, the electricity that enters from the rim is effectively guided from the tread surface of the tread portion to the road surface, thus enabling a significant effect of improvement in electrical resistance reduction performance. As a result, a low heat build-up rubber can be used for the cap tread rubber and the undertread rubber. This enables a significant effect of improvement in rolling resistance reduction performance and high-speed durability performance. Furthermore, according to this pneumatic tire, by the ground tread rubber having a width in the thickness direction at the second end that is greater than the width at the first end in a meridian cross-section, the contact area of the ground tread rubber with the belt layer or the belt reinforcing layer is increased. As a result, the flow of electricity in and out is improved, and thus a significant electrical resistance reduction effect can be obtained.

A pneumatic tire according to a second aspect of the present technology is the pneumatic tire of the first aspect, wherein the cap tread rubber has a loss tangent tan δ at 60° C. of 0.20 or greater, and the undertread rubber has a loss tangent tan δ at 60° C. of 0.20 or less.

According to this pneumatic tire, by the loss tangent tan δ at 60° C. of the cap tread rubber being 0.20 or greater and the loss tangent tan δ at 60° C. of the undertread rubber being 0.20 or less, the cap tread rubber that constitutes the tread surface has low heat build-up compared to the undertread rubber, which is located inward of the cap tread rubber in the tire radial direction. As a result, the effect of improvement in rolling resistance reduction performance and high-speed durability performance can be ensured. Additionally, by the loss tangent tan δ at 60° C. of the cap tread rubber being 0.20 of greater, the modulus of repulsion elasticity is low and energy can be absorbed, thus steering stability performance on wet road surfaces can be improved. A pneumatic tire according to a third aspect of the present technology is the pneumatic tire according to the first or second aspect, wherein the electrically conductive rubber has a greater loss tangent tan δ at 60° C. than that of the ground tread rubber.

According to this pneumatic tire, steering stability performance on wet road surfaces can be improved.

A pneumatic tire according to a fourth aspect of the present technology is the pneumatic tire according to any one of the first to third aspects, wherein the electrically conductive rubber has a greater value than that of the ground tread rubber for: carbon black volume fraction×dibutyl phthalate oil absorption number/100.

According to this pneumatic tire, electrical resistance can be further reduced.

A pneumatic tire according to a fifth aspect of the present technology is the pneumatic tire according to any one of the first to fourth aspects, wherein the ground tread rubber is disposed on opposite sides of a tire equatorial plane in a tire width direction in a range starting at the tire equatorial plane which is from 0% to 50% of a ground contact width.

According to this pneumatic tire, the range on opposite sides of the tire equatorial plane in the tire width direction corresponds to regions in the tread surface that experience comparatively high ground contact pressure. By disposing the ground tread rubber in these regions, electricity that enters from the rim can be effectively guided from the tread surface of the tread portion to the road surface. As a result, a significant effect of improvement in electrical resistance reduction performance can be obtained.

The pneumatic tire according to the present technology can exhibit good rolling resistance reduction performance, high-speed durability performance, and electrical resistance reduction performance in a compatible manner.

BRIEF DESCRIPTION OF DRAWINGS

FIG. 21 is a table showing results of performance tests on pneumatic tires according to working examples of the present technology.

DETAILED DESCRIPTION

An embodiment of the present technology is described in detail below with reference to the drawings. However, the present technology is not limited by the embodiment. Furthermore, components of the embodiment include components that may be easily replaced by those skilled in the art or that are substantially identical to components of the embodiment. Furthermore, modified examples of the embodiment may be combined as desired within the scope apparent to those skilled in the art.

Figure 1:
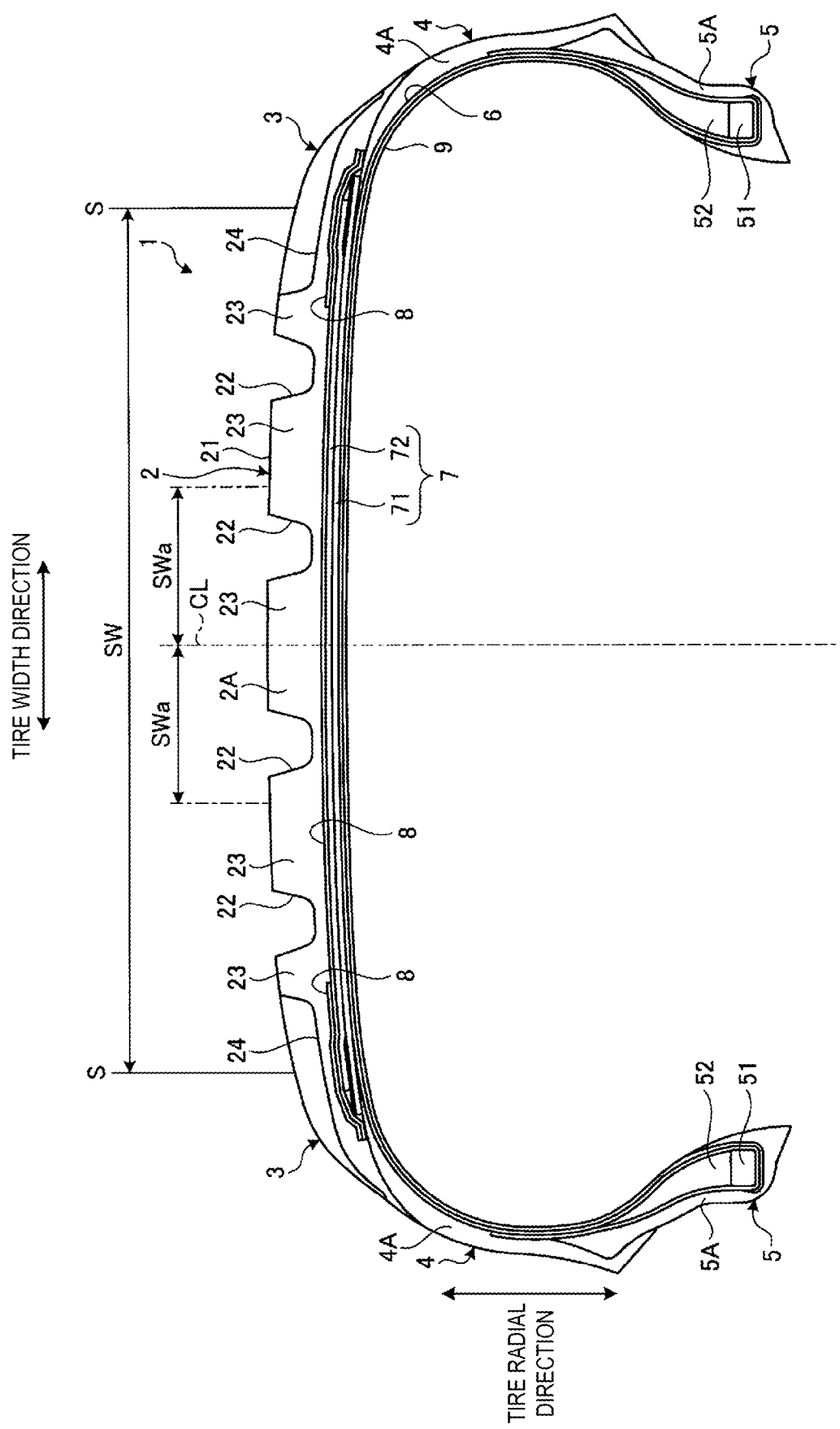
FIG. 1 is a meridian cross-sectional view of a pneumatic tire according to an embodiment of the present technology.
Figure 2:
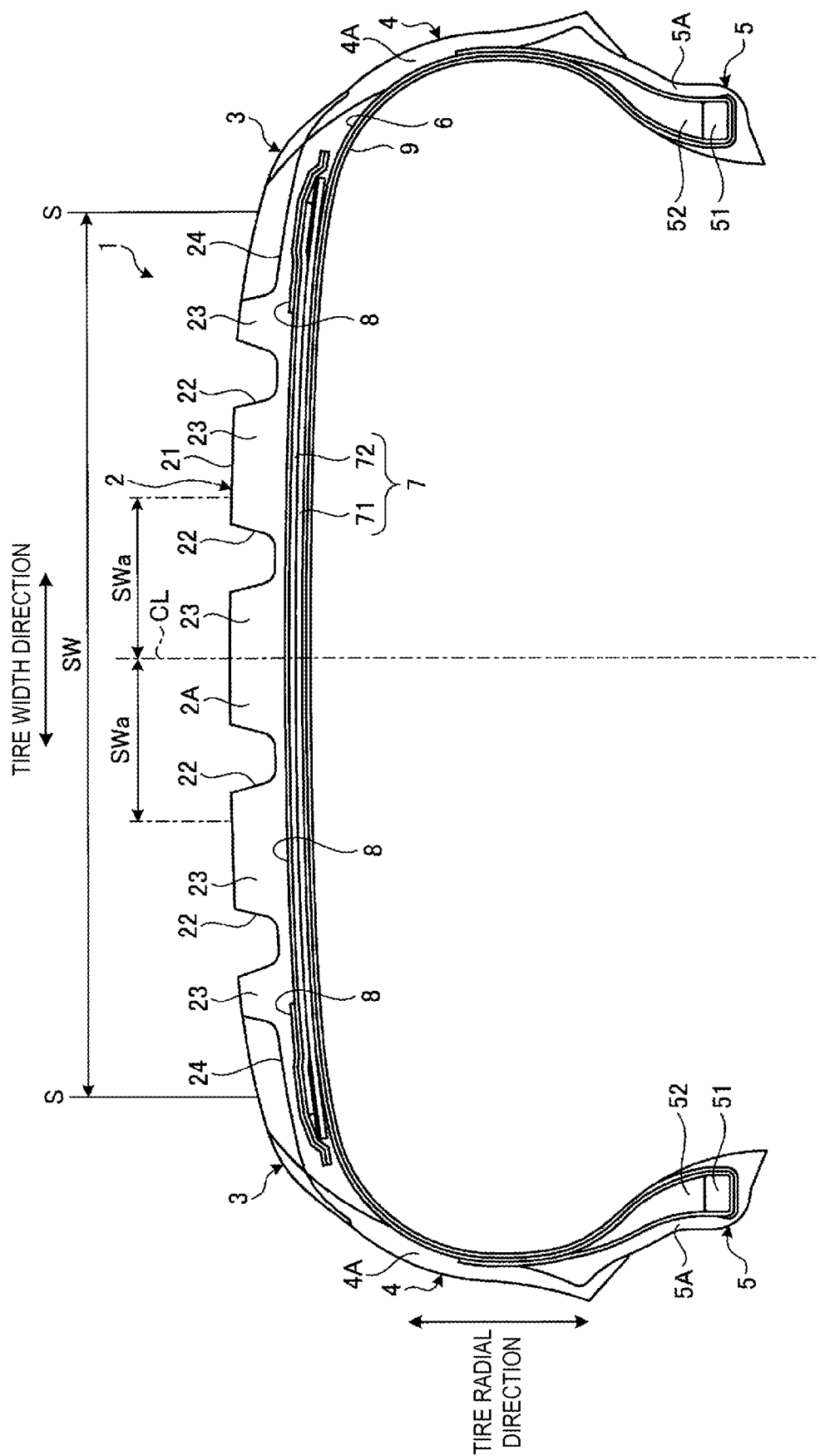
FIG. 2 is a meridian cross-sectional view of a pneumatic tire according to an embodiment of the present technology.

FIGS. 1 and 2 are meridian cross-sectional views of a pneumatic tire according to the present embodiment.

In the following description, "tire radial direction" refers to the direction orthogonal to the rotational axis (not illustrated) of a pneumatic tire 1. "Inward in the tire radial direction" refers to the direction toward the rotational axis in the tire radial direction, and "outward in the tire radial direction" refers to the direction away from the rotational axis in the tire radial direction. "Tire circumferential direction" refers to the rotation direction taking the rotational axis as a center axis. In addition, "tire width direction" refers to the direction parallel to the rotational axis. "Inward in the tire width direction" refers to the direction toward a tire equatorial plane CL (tire equatorial line) in the tire width direction, and "outward in the tire width direction" refers to the direction away from the tire equatorial plane CL in the tire width direction. "Tire equatorial plane CL" refers to a plane that is orthogonal to the rotational axis of the pneumatic tire 1 and that passes through the center of the pneumatic tire 1 in the tire width direction. "Tire width" is a width in the tire width direction between components located outward in the tire width direction, or in other words, the distance between the components that are most distant from the tire equatorial plane CL in the tire width direction. "Tire equatorial line" refers to a line along the tire circumferential direction of the pneumatic tire 1 that lies on the tire equatorial plane CL. In the present embodiment, the tire equatorial line is denoted by CL which is the same reference sign as that of the tire equatorial plane.

As illustrated in FIGS. 1 and 2, the pneumatic tire 1 of the present embodiment includes a tread portion 2, shoulder portions 3 on opposite sides of the tread portion 2, and sidewall portions 4 and bead portions 5 continuing in that order from the shoulder portions 3. The pneumatic tire 1 also includes a carcass layer 6, a belt layer 7, a belt reinforcing layer 8, and an innerliner layer 9.

The tread portion 2 is made of tread rubber 2A, is exposed on the outermost side of the pneumatic tire 1 in the tire radial direction, and the surface thereof constitutes the contour of the pneumatic tire 1. A tread surface 21 is formed on an outer peripheral surface of the tread portion 2, in other words, on a road contact surface that comes in contact with a road surface when traveling. The tread surface 21 is provided with a plurality (four in the present embodiment) of main grooves 22 that extend in the tire circumferential direction. The main grooves 22 are straight main grooves parallel to the tire equatorial line CL. Moreover, a plurality of rib-like land portions 23 that extend in the tire circumferential direction are formed in the tread surface 21, defined by the plurality of main grooves 22. Note that the main grooves 22 may extend in the tire circumferential direction in a bending or curving manner. Additionally, lug grooves 24 that extend in a direction that intersects the main grooves 22 are provided in the land portions 23 of the tread surface 21. In the present embodiment, the lug grooves 24 show in the outermost land portions 23 in the tire width direction. The lug grooves 24 may meet the main grooves 22.

Alternatively, the lug grooves 24 may have one end that does not meet the main grooves 22 and terminates within a land portion 23. In embodiments in which both ends of the lug grooves 24 meet the main grooves 22, the land portions 23 are formed into a plurality of block-like land portions divided in the tire circumferential direction. Note that the lug grooves 24 may extend inclined with respect to the tire circumferential direction in a bending or curving manner.

The shoulder portions 3 are regions of the tread portion 2 located outward in the tire width direction. In other words, the shoulder portions 3 are made of the tread rubber 2A. Additionally, the sidewall portions 4 are exposed on the outermost sides of the pneumatic tire 1 in the tire width direction. The sidewall portions 4 are each made of a side rubber 4A. As illustrated in FIG. 1, an outer end portion of the side rubber 4A in the tire radial direction is disposed inward of an end portion of the tread rubber 2A in the tire radial direction. An inner end portion of the side rubber 4A in the tire radial direction is disposed outward of an end portion of a rim cushion rubber 5A described below in the tire width direction. Additionally, as illustrated in FIG. 2, the outer end portion of the side rubber 4A in the tire radial direction may be disposed outward of the end portion of the tread rubber 2A in the tire radial direction and extend to the shoulder portion 3. The bead portions 5 each include a bead core 51 and a bead filler 52. The bead core 51 is formed by a bead wire, which is a steel wire, wound into an annular shape. The bead filler 52 is a rubber material that is disposed in space formed by an end of the carcass layer 6 in the tire width direction folded back at the position of the bead core 51. The bead portions 5 each include an outwardly exposed rim cushion rubber 5A that comes into contact with a rim R (illustrated by a long dashed double-short dashed line in FIGS. 3 to 8). The rim cushion rubber 5A constitutes the outer periphery of the bead portion 5. The rim cushion rubber 5A extends from the inner side of the bead portion 5 to the outer side of the bead portion 5 (sidewall portion 4) via the lower end portion of the bead portion 5 so as to cover the bead filler 52. Note that in FIGS. 3 to 8, when the pneumatic tire 1 is mounted to the rim R, the rim cushion rubber 5A presses against the rim R at a radially inner portion of a bead toe portion located inward of the bead portion 5, and deforms.

The end portions of the carcass layer 6 in the tire width direction are folded over the pair of bead cores 51 from inward to outward in the tire width direction, and the carcass layer 6 is stretched in a toroidal shape in the tire circumferential direction to form the framework of the tire. The carcass layer 6 is constituted by a plurality of coating-rubber-covered carcass cords (not illustrated) disposed in alignment at an angle with respect to the tire circumferential direction that conforms with the tire meridian direction. The carcass cords are made of organic fibers (e.g., polyester, rayon, nylon, or the like). At least one carcass layer 6 is provided. Note that in FIGS. 1 and 2, the folded end portion of the carcass layer 6 is provided covering the whole bead filler 52. However the folded end portion may be provided covering the bead filler 52 partially, so that the bead filler 52 is in contact with the rim cushion rubber 5A (see FIG. 5). Additionally, a bead reinforcing layer 10 (see FIG. 6), which includes cord-rubber-coated steel cords or organic fibers (polyester, rayon, nylon, or the like), may be disposed between the outer folded end portion of the carcass layer 6 in the tire width direction and the rim cushion rubber 5A.

The belt layer 7 has a multi-layer structure in which at least two layers (belts 71 and 72) are layered. In the tread portion 2, the belt layer 7 is disposed outward of the carcass layer 6 in the tire radial direction on the outer periphery thereof and covers the carcass layer 6 in the tire circumferential direction. The belts 71 and 72 each include a plurality of coating-rubber-covered cords (not illustrated) disposed in alignment at a predetermined angle with respect to the tire circumferential direction (for example, from 20 degrees to 30 degrees). The cords are made of steel or organic fibers (polyester, rayon, nylon, or the like). Additionally, the belts 71 and 72 overlap each other and are disposed so that the direction of the cords of the respective belts intersects each other.

Figure 14:
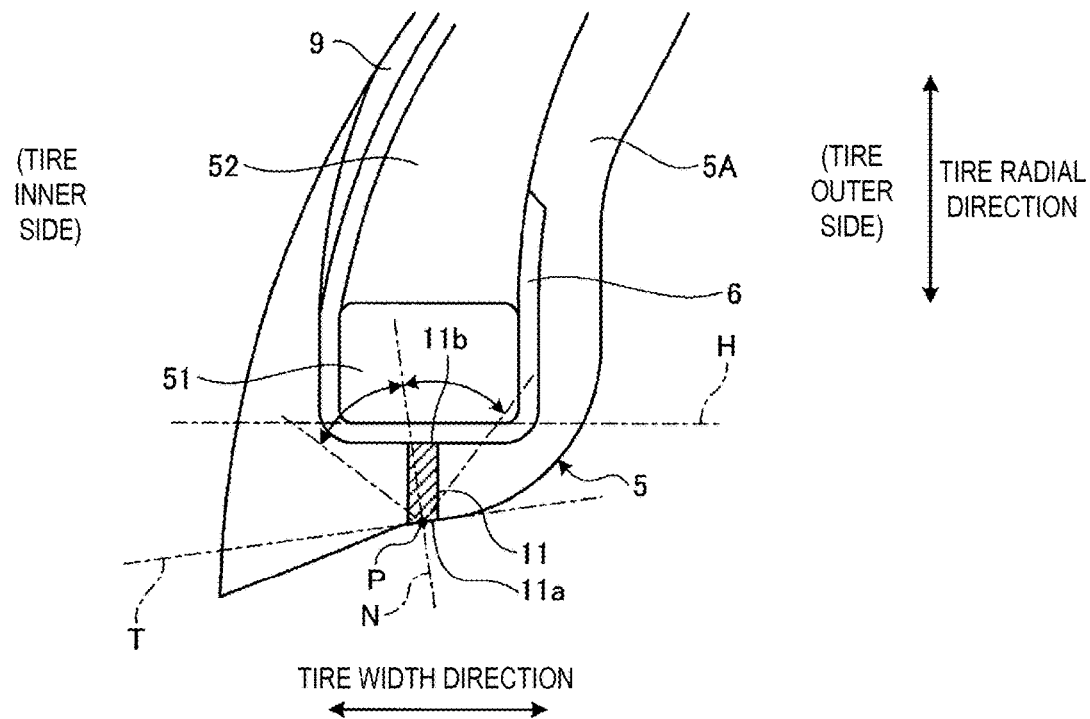
FIG. 14 is an enlarged view of a main part of the pneumatic tire illustrated in FIGS. 1 and 2.

The belt reinforcing layer 8 is disposed outward of the belt layer 7 in the tire radial direction on the outer periphery thereof and covers the belt layer 7 in the tire circumferential direction. The belt reinforcing layer 8 includes a plurality of coating-rubber-covered cords (not illustrated) disposed in alignment in the tire width direction substantially parallel (±5 degrees) to the tire circumferential direction. The cords are made of steel or organic fibers (polyester, rayon, nylon, or the like). The belt reinforcing layer 8 illustrated in FIGS. 1 and 2 is disposed so as to cover all of the belt layer 7 and to cover, in a multi-layered manner, end portions of the belt layer 7 in the tire width direction. The configuration of the belt reinforcing layer 8 is not limited to that described above. While not illustrated in the drawings, a configuration may be used in which, for example, two layers are disposed so as to cover all of the belt layer 7 or to cover only the end portions of the belt layer 7 in the tire width direction. Additionally, while not illustrated in the drawings, a configuration of the belt reinforcing layer 8 may be used in which, for example, one layer is disposed so as to cover all of the belt layer 7 or to cover only the end portions of the belt layer 7 in the tire width direction. In other words, the belt reinforcing layer 8 overlaps at least the end portion of the belt layer 7 in the tire width direction. Additionally, the belt reinforcing layer 8 is constituted of a band-like strip material (having, for example, a width of 10 mm) wound in the tire circumferential direction. The innerliner layer 9 is the tire inner surface, that is, the inner peripheral surface of the carcass layer 6. Both ends of the innerliner layer 9 in the tire width direction reach the bead cores 51 of the bead portions 5 and extend in the tire circumferential direction in a toroidal shape. The innerliner layer 9 prevents air molecules from escaping from the tire. Note that, as illustrated in FIGS. 1 and 2, the innerliner layer 9 may be disposed extending to lower portions of the bead cores 51 (inward in the tire radial direction). However, as illustrated in FIGS. 8 and 14, the innerliner layer 9 may be disposed extending to a position on the tire inner side of the bead portion 5 near to the bead core 51.

FIGS. 3 to 8 are enlarged views of a main part of the pneumatic tire illustrated in FIGS. 1 and 2.

In the pneumatic tire 1 described above, as illustrated in FIGS. 3 to 8, the rim cushion rubber 5A is provided with an electrically conductive rubber 11. The electrically conductive rubber 11 is disposed in the rim cushion rubber 5A and includes a first end 11a and a second end 11b. The first end 11a is a portion in contact with the rim R exposed on the outer surface of the rim cushion rubber 5A. The second end 11b is provided in contact with a tire component adjacent to the rim cushion rubber 5A. Additionally, the electrically conductive rubber 11 is made of a rubber material with a lower electrical resistance value than that of the rim cushion rubber 5A. The electrically conductive rubber 11 may be provided continuously and may be provided intermittently in the tire circumferential direction.

Figure 3:
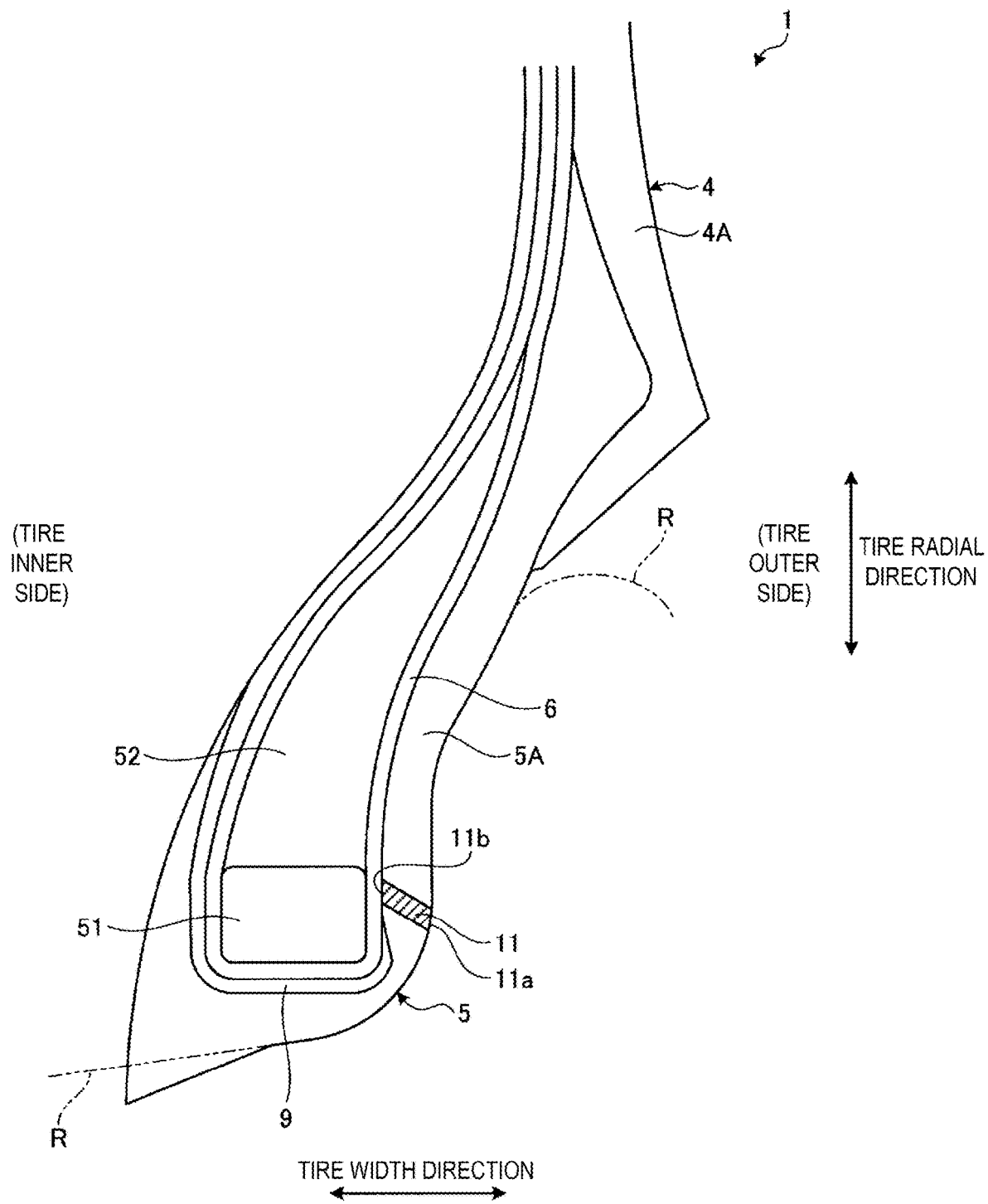
FIG. 3 is an enlarged view of a main part of the pneumatic tire illustrated in FIGS. 1 and 2.
Figure 4:
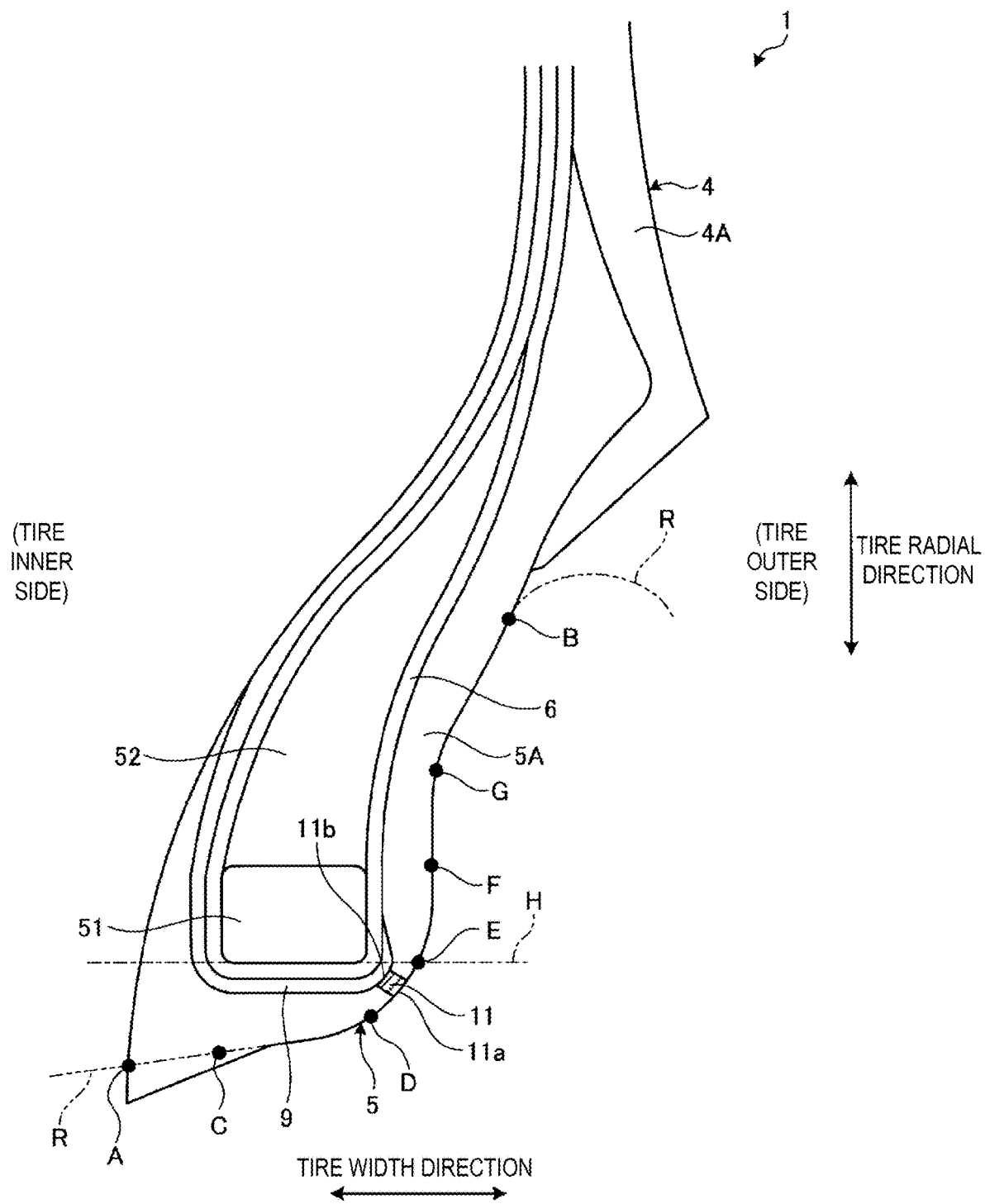
FIG. 4 is an enlarged view of a main part of the pneumatic tire illustrated in FIGS. 1 and 2.
Figure 5:
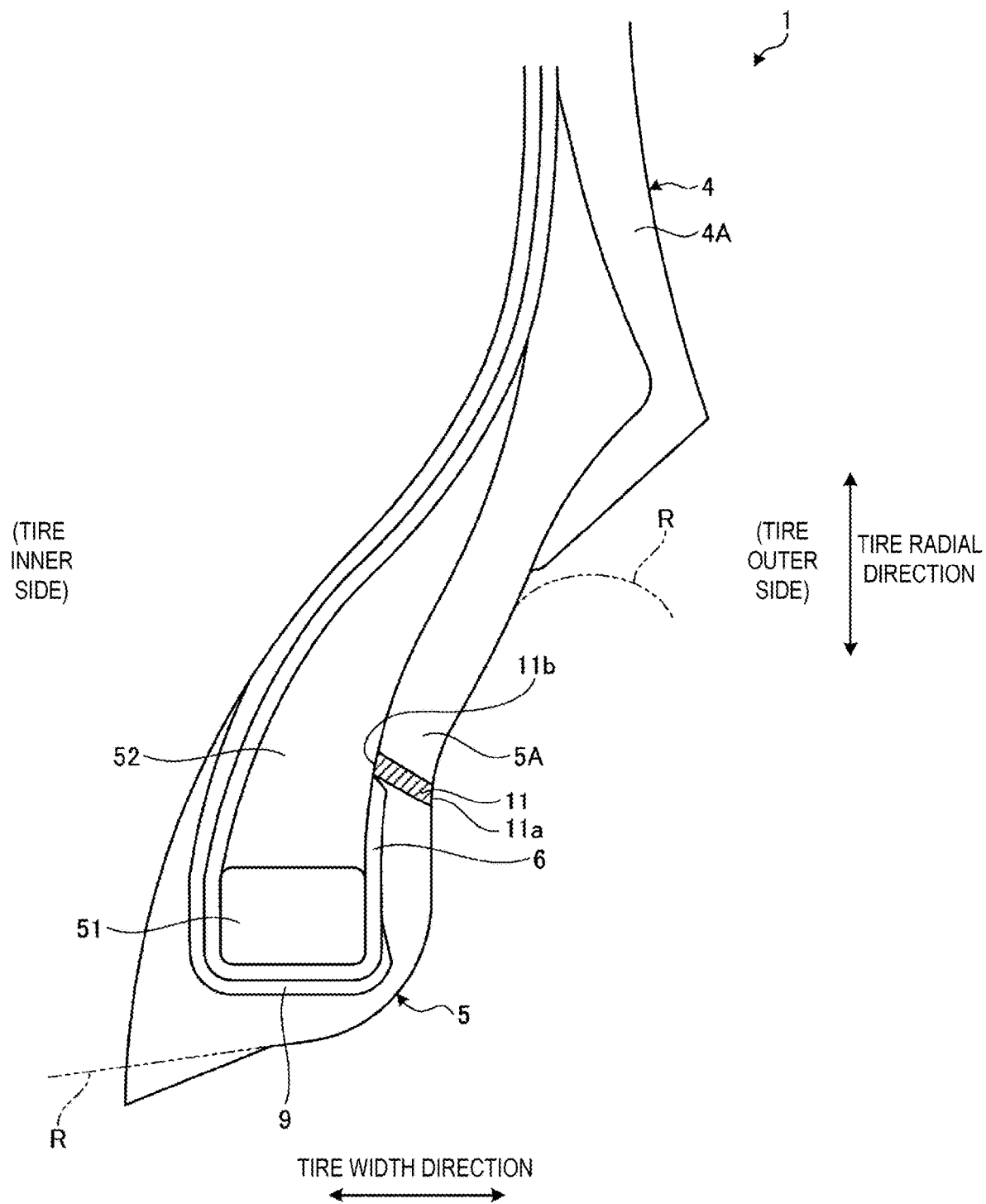
FIG. 5 is an enlarged view of a main part of the pneumatic tire illustrated in FIGS. 1 and 2.
Figure 6:
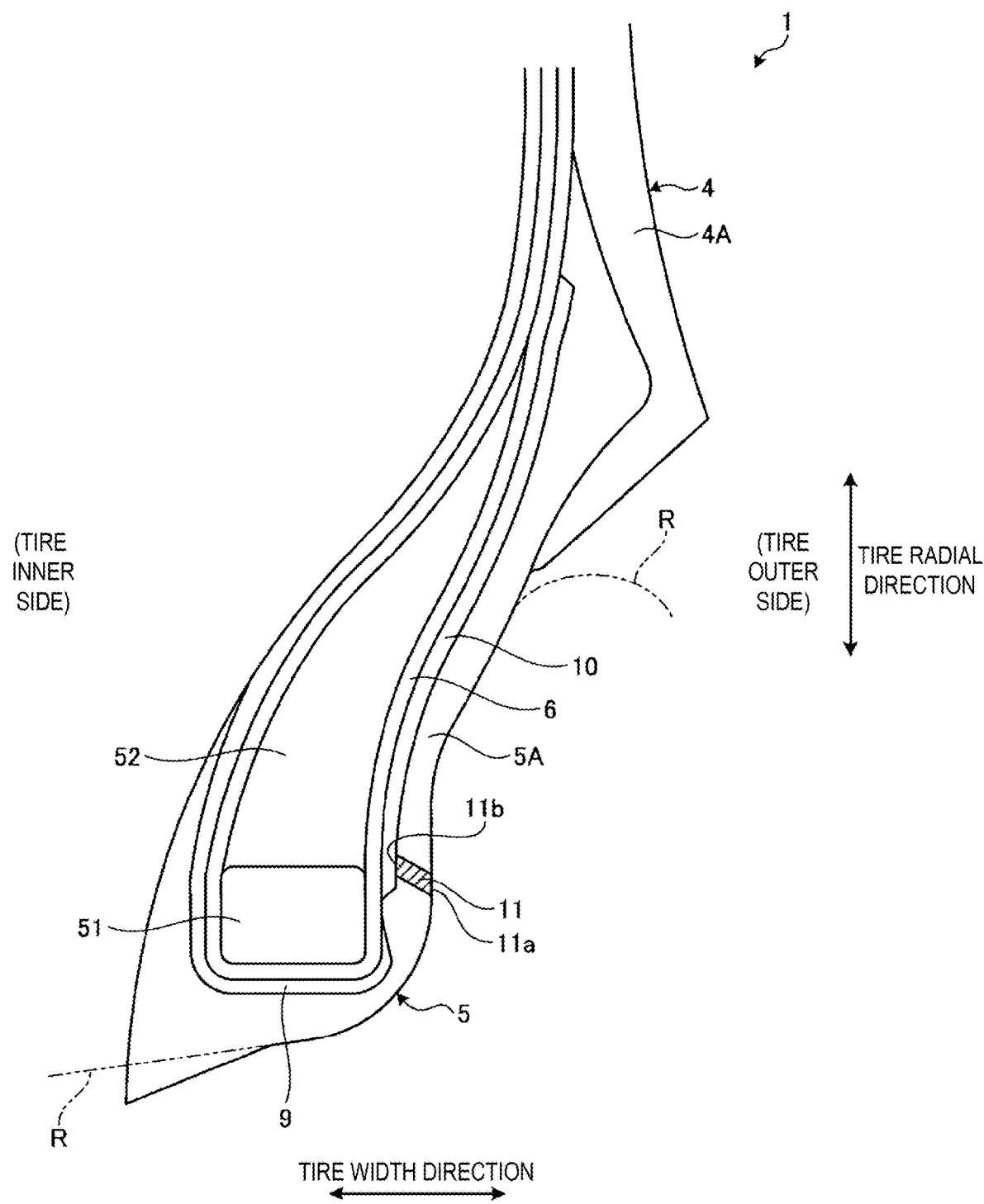
FIG. 6 is an enlarged view of a main part of the pneumatic tire illustrated in FIGS. 1 and 2.
Figure 7:
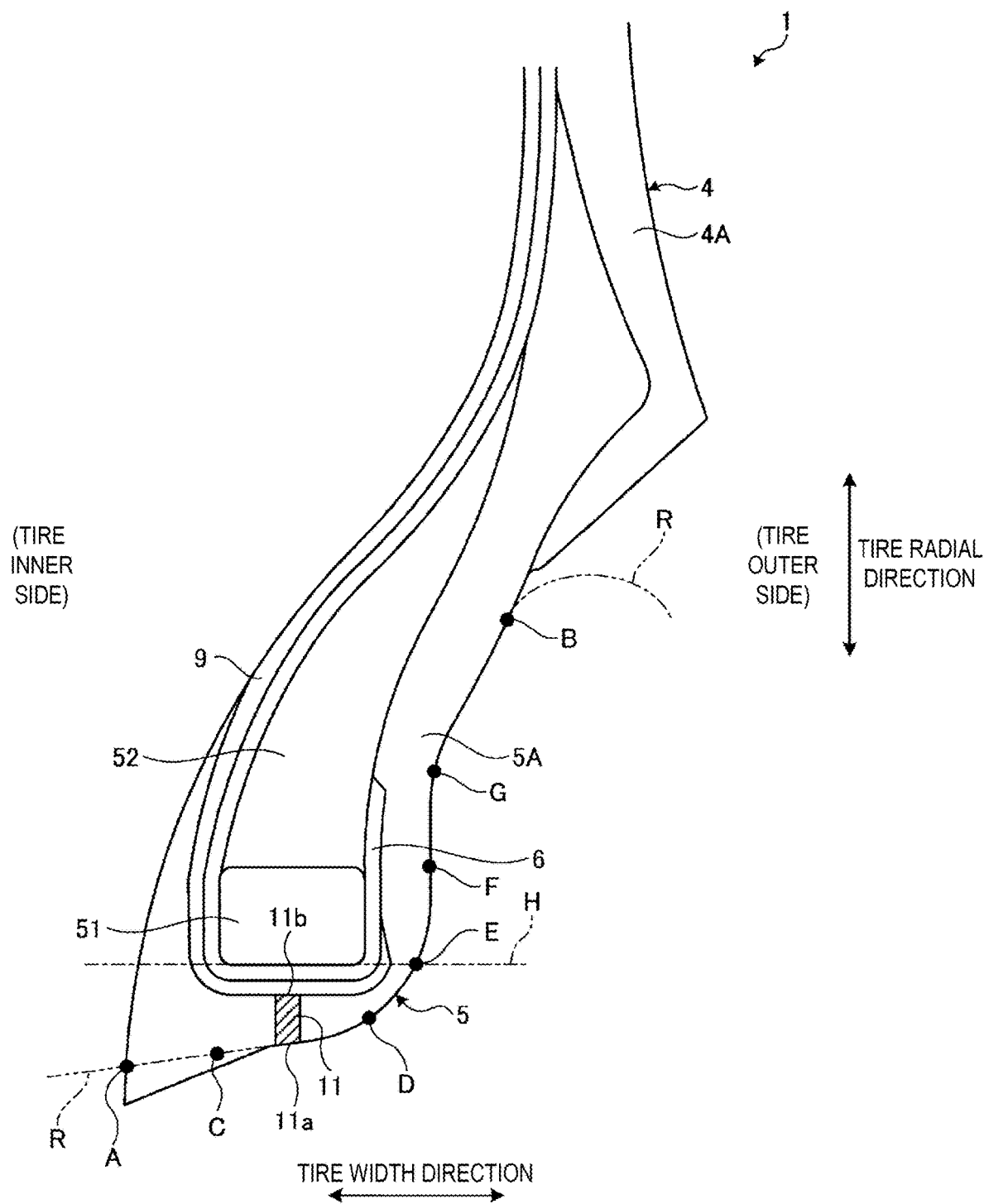
FIG. 7 is an enlarged view of a main part of the pneumatic tire illustrated in FIGS. 1 and 2.
Figure 8:
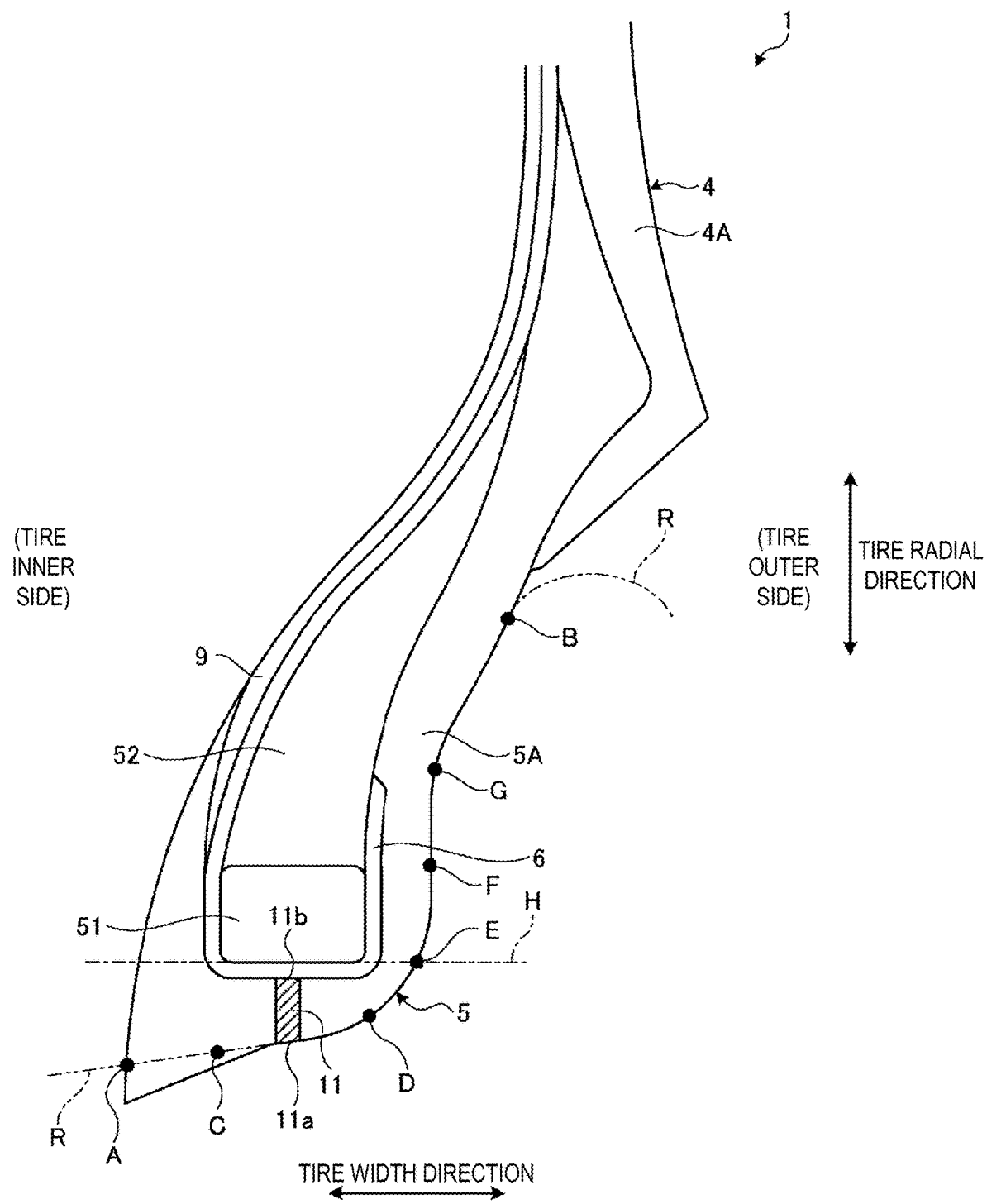
FIG. 8 is an enlarged view of a main part of the pneumatic tire illustrated in FIGS. 1 and 2.
Figure 9:
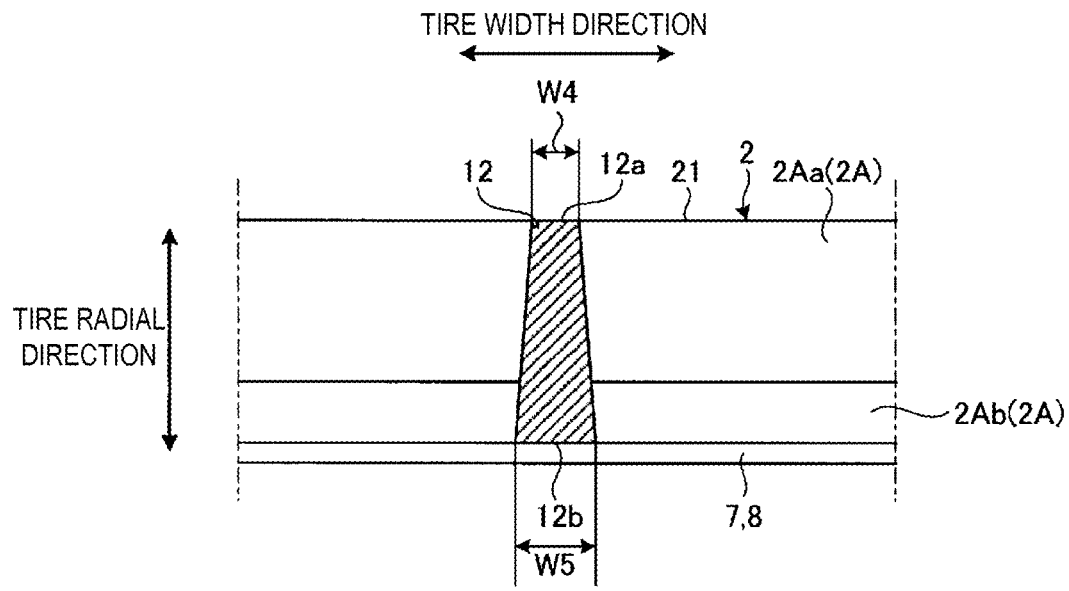
FIG. 9 is an enlarged view of a main part of the pneumatic tire illustrated in FIGS. 1 and 2.
Figure 10:
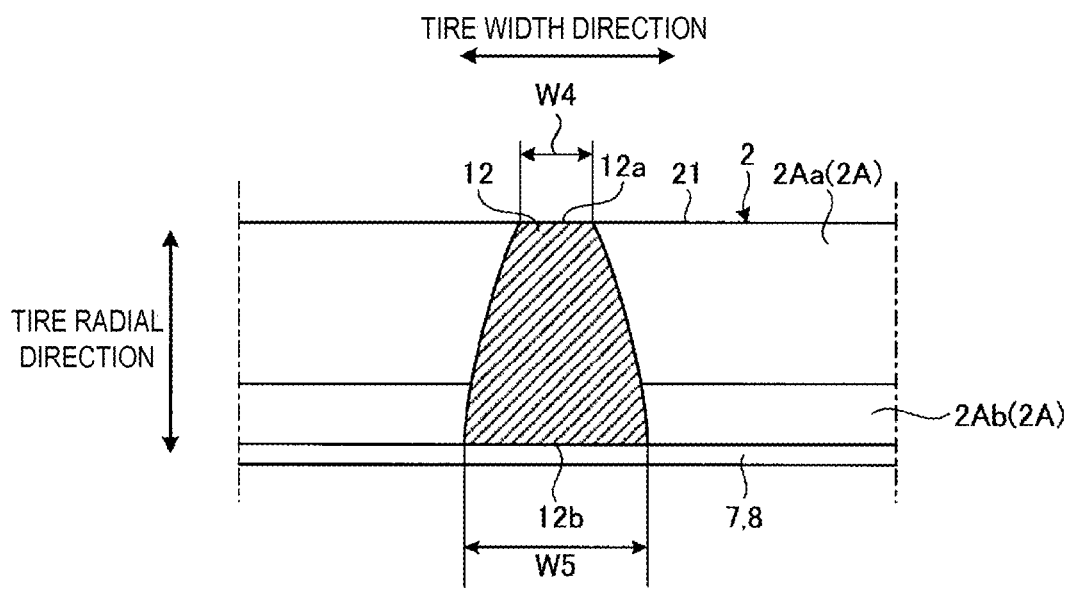
FIG. 10 is an enlarged view of a main part of the pneumatic tire illustrated in FIGS. 1 and 2.
Figure 11:
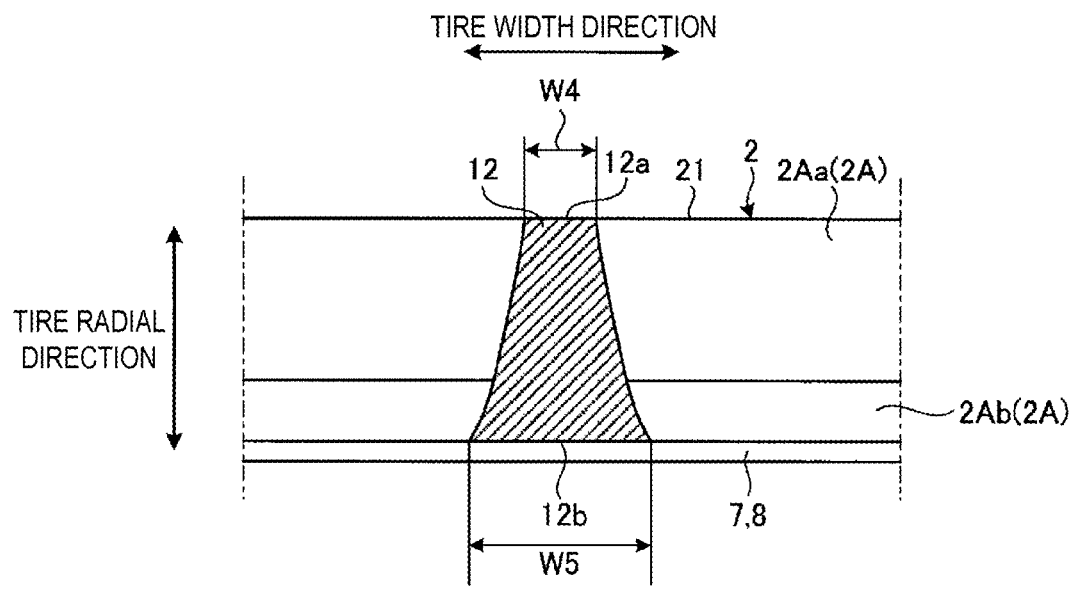
FIG. 11 is an enlarged view of a main part of the pneumatic tire illustrated in FIGS. 1 and 2.
Figure 12:
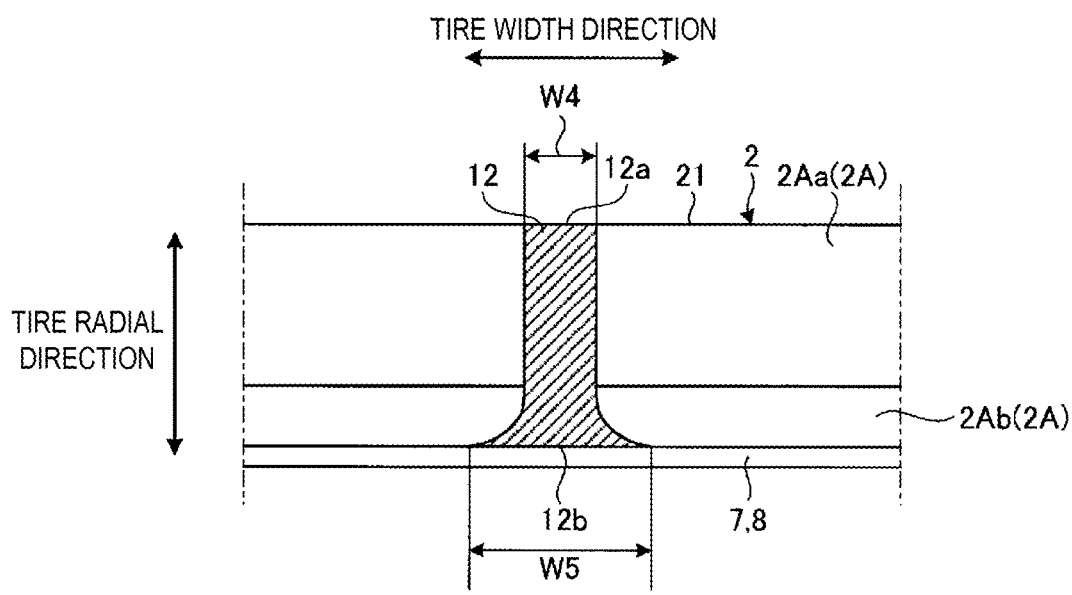
FIG. 12 is an enlarged view of a main part of the pneumatic tire illustrated in FIGS. 1 and 2.

"Tire component adjacent to the rim cushion rubber 5A" refers to the carcass layer 6 in FIGS. 3 and 8, the innerliner layer 9 in FIGS. 4 and 7, the bead filler 52 in FIG. 5, and the bead reinforcing layer 10 in FIG. 6.

Note that the electrically conductive rubber 11 as illustrated in FIGS. 3 to 8 is provided in contact with the tire component adjacent to the rim cushion rubber 5A. However, the electrically conductive rubber 11 may be in contact with a plurality of tire components in order to enable a more significant effect of guiding the electricity that enters from the rim R to the tread portion 2 side through the electrically conductive rubber 11 and the tire component. Additionally, positioning the conductive rubber 11 so that the first end 11a is exposed on the outer surface of the rim cushion rubber 5A and the second end 11b is in contact with the tire component adjacent to the rim cushion rubber 5A with the distance between the first end 11a and the second end 11b being the shortest distance possible is preferable from the point of view of obtaining a more significant effect of guiding the electricity that enters from the rim R to the tread portion 2 side through the conductive rubber 11 and the tire component.

As illustrated in FIGS. 9 to 12, which are enlarged views of a main part of the pneumatic tire 1 illustrated in FIGS. 1 and 2, in the pneumatic tire 1 of the present embodiment, the tread portion 2 is provided with an ground tread rubber 12 which passes through the tread rubber 2A.

Here, as illustrated in FIGS. 9 to 12, the tread rubber 2A which constitutes the tread portion 2 includes a cap tread rubber 2Aa exposed on the tread surface 21, and an undertread rubber 2Ab disposed inward of the cap tread rubber 2Aa in the tire radial direction and adjacent to the belt reinforcing layer 8 or the belt layer 7.

The ground tread rubber 12 passes through the cap tread rubber 2Aa and the undertread rubber 2Ab of the tread portion 2 and includes a first end 12a that is exposed on the tread surface 21 and a second end 12b that is disposed in contact with the belt layer 7 or the belt reinforcing layer 8. Additionally, the ground tread rubber 12, in a meridian cross-section, has a width W5 in the thickness direction at the second end 12b that is greater than a width W4 at the first end 12a. The ground tread rubber 12 also has a lower electrical resistance value than that of the cap tread rubber 2Aa.

The ground tread rubber 12 with the width W4 at the first end 12a and the width W5 at the second end 12b gradually increases in width from the first end 12a to the second end 12b as illustrated in FIGS. 9 to 12. The ground tread rubber 12 illustrated in FIG. 9 continuously widens in a rectilinear manner from the first end 12a to the second end 12b. The ground tread rubber 12 illustrated in FIG. 10 bulges outward between the first end 12a and the second end 12b with the width continuously increasing. The ground tread rubber 12 illustrated in FIG. 11 curves inward between the first end 12a and the second end 12b with the width continuously increasing. The ground tread rubber 12 illustrated in FIG. 12 has a uniform width between the first end 12a and the second end 12b with the width increasing in an arcuate manner from a position at the second end 12b. Note that the ground tread rubbers 12 illustrated in FIGS. 9 to 11 may also increase in width in an arcuate manner from a position at the second end 12b. Additionally, although not illustrated, any configurations of the ground tread rubber 12 with the width W5 of the second end 12b being greater than the width W4 of the first end 12a may narrow at a position therebetween.

In such a manner, the pneumatic tire 1 of the present embodiment includes the rim cushion rubber 5A disposed in the region of the bead portion 5 where it comes into contact with the rim R and the electrically conductive rubber 11. The electrically conductive rubber 11 is disposed in the rim cushion rubber 5A and has an electrical resistance value lower than that of the rim cushion rubber 5A. The electrically conductive rubber 11 also includes the first end 11a disposed in contact with the rim R exposed on the outer surface of the rim cushion rubber 5A and the second end 11b disposed in contact with a tire component adjacent to the rim cushion rubber 5A.

The pneumatic tire 1 of the present embodiment further includes the ground tread rubber 12 with an electrical resistance value lower than the cap tread rubber 2Aa. The ground tread rubber 12 includes the first end 12a disposed exposed on the tread surface 21 and passing through the cap tread rubber 2Aa and the undertread rubber 2Ab of the tread portion 2, and the second end 12b disposed in contact with the belt layer 7 or the belt reinforcing layer 8. In a meridian cross-section, the width W5 in the thickness direction at the second end 12b is greater than the width W4 at the first end 12a.

According to this pneumatic tire 1, by including the electrically conductive rubber 11 with a lower electrical resistance value than the rim cushion rubber 5A, electricity that enters from the rim R flows toward the tread portion 2 through the electrically conductive rubber 11 and the tire component. Because of this, a low heat build-up rubber can be used without taking into consideration the electrical resistance value of the rim cushion rubber 5A, and thus rolling resistance reduction performance and high-speed durability performance can be improved. As a result, good rolling resistance reduction performance, high-speed durability performance, and electrical resistance reduction performance can be achieved in a compatible manner.

Furthermore, according to this pneumatic tire 1, by including the ground tread rubber 12, the electricity that enters from the rim R is effectively guided from the tread surface 21 of the tread portion 2 to the road surface, thus enabling a significant effect of improvement in electrical resistance reduction performance. As a result, a low heat build-up rubber can be used for the cap tread rubber 2Aa and the undertread rubber 2Ab. This enables a significant effect of improvement in rolling resistance reduction performance and high-speed durability performance.

Note that in recent years, there has been a trend of increasing the amount of silica in a cap tread rubber such as the cap tread rubber 2Aa. Silica is an insulating material so it is difficult for electricity to pass through it. Thus, by disposing the ground tread rubber 12 so that it passes through the cap tread rubber 2Aa and the undertread rubber 2Ab, with the second end 12b in contact with the belt layer 7 or the belt reinforcing layer 8, electricity that enters from the rim R can be effectively guided from the tread surface 21 of the tread portion 2 to the road surface.

Furthermore, according to this pneumatic tire 1, by the ground tread rubber 12 having a width W5 in the thickness direction at the second end 12b that is greater than the width W4 at the first end 12a in a meridian cross-section, the contact area of the ground tread rubber 12 with the belt layer 7 or the belt reinforcing layer 8 is increased. As a result, the flow of electricity in and out is improved, and thus a significant electrical resistance reduction effect can be obtained.

Note that the width W4 and the width W5 of the ground tread rubber 12 is preferably from 0.5 mm to 10.0 mm. When the width W4 and the width W5 of the ground tread rubber 12 has a minimum dimension of less than 0.5 mm, the electrical resistance is low, and thus the electrical resistance reduction effect tends to be decreased. When the width W4 and the width W5 of the ground tread rubber 12 has a maximum dimension of greater than 10.0 mm, the volume of the electrically conductive rubber 11 is great and thus the heat build-up is increased. As a result, rolling resistance reduction performance and high-speed durability performance tend to be decreased. Accordingly, setting the width W4 and the width W5 of the ground tread rubber 12 to a range of from 0.5 mm to 10.0 mm is preferable in order to achieve good rolling resistance reduction performance, high-speed durability performance, and electrical resistance reduction performance in a compatible manner. Note that in embodiments in which the ground tread rubber 12 narrows at a position between the first end 12a and the second end 12b, the narrowed width is preferably 0.5 mm or greater.

The width W4 and the width W5 of the ground tread rubber 12 is more preferably from 0.5 mm to 6.0 mm By the width W4 and the width W5 of the ground tread rubber 12 having a maximum dimension of 6.0 mm or less, an increase in heat build-up is suppressed by the volume of the electrically conductive rubber 11 being prevented from being too large. Accordingly, setting the width W4 and the width W5 of the ground tread rubber 12 to a range of from 0.5 mm to 6.0 mm is more preferable in order to achieve good rolling resistance reduction performance, high-speed durability performance, and electrical resistance reduction performance in a compatible manner. Note that in embodiments in which the ground tread rubber 12 narrows at a position between the first end 12a and the second end 12b, the narrowed width is preferably 0.5 mm or greater.

Additionally, in the pneumatic tire 1 of the present embodiment, the loss tangent tan δ at 60° C. of the cap tread rubber 2Aa is 0.20 or greater, and the loss tangent tan δ at 60° C. of the undertread rubber 2Ab is 0.20 or less.

According to this pneumatic tire 1, by the loss tangent tan δ at 60° C. of the cap tread rubber 2Aa being 0.20 or greater and the loss tangent tan δ at 60° C. of the undertread rubber 2Ab being 0.20 or less, the cap tread rubber 2Aa that constitutes the tread surface 21 has low heat build-up compared to the undertread rubber 2Ab, which is located inward of the cap tread rubber 2Aa in the tire radial direction. As a result, the effect of improvement in rolling resistance reduction performance and high-speed durability performance can be ensured. Additionally, by the loss tangent tan δ at 60° C. of the cap tread rubber 2Aa being 0.20 of greater, the modulus of repulsion elasticity is low and energy can be absorbed, thus steering stability performance on wet road surfaces can be improved.

Additionally, in the pneumatic tire 1 of the present embodiment, the electrically conductive rubber 11 has a greater loss tangent tan δ at 60° C. than the ground tread rubber 12.

According to this pneumatic tire 1, steering stability performance on wet road surfaces can be improved.

Additionally, in the pneumatic tire 1 of the present embodiment, the electrically conductive rubber 11 has a greater value than the ground tread rubber 12 for: carbon black volume fraction×dibutyl phthalate oil absorption number/100. The volume fraction of a carbon black is the proportion of the volume of a carbon black to the total volume of all ingredients in the mixture. The dibutyl phthalate oil absorption number is the amount of dibutyl phthalate that carbon black can absorb and is measured in accordance with Oil Absorption Method A of JIS K6217-4.

According to this pneumatic tire 1, electrical resistance can be further reduced.

Additionally, in the pneumatic tire 1 of the present embodiment, the ground tread rubber 12 is disposed on opposite sides of the tire equatorial plane CL in the tire width direction in a range SWa starting at the tire equatorial plane which is from 0% to 50% of a ground contact width SW.

The ground contact width SW refers to the dimension of the ground contact region in the tire width direction. The ground contact region is a region where the tread surface 21 of the tread portion 2 of the pneumatic tire 1 comes into contact with the road surface, with the pneumatic tire 1 assembled on a regular rim, inflated to a regular internal pressure, and loaded with 70% of a regular load. In FIGS. 1 and 2, ground contact edges located on the outermost ends of the ground contact region in the tire width direction are denoted by S. The ground contact width, which is the dimension between both ground contact edges S in the tire width direction is denoted by SW.

Here, "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to "maximum air pressure" defined by JATMA, a maximum value given in "tire load limits at various cold inflation pressures" defined by TRA, or "inflation pressures" defined by ETRTO. Note that the "regular load" refers to "maximum load capacity" defined by JATMA, a maximum value given in "tire load limits at various cold inflation pressures" defined by TRA, or "load capacity" defined by ETRTO.

According to this pneumatic tire 1, the range SWa on opposite sides of the tire equatorial plane CL in the tire width direction are regions in the tread surface 21 that experience comparatively high ground contact pressure. By disposing the ground tread rubber 12 in these regions, electricity that enters from the rim R can be effectively guided from the tread surface 21 of the tread portion 2 to the road surface. As a result, a significant effect of improvement in electrical resistance reduction performance can be obtained.

As illustrated in FIGS. 4, 7, and 8, in the pneumatic tire 1 of the present embodiment, the first end 11a of the electrically conductive rubber 11 is preferably disposed inward of a horizontal line H in the tire radial direction based on an inner end of the bead core 51 of the bead portion 5 in the tire radial direction, in a meridian cross-section.

Figure 13:
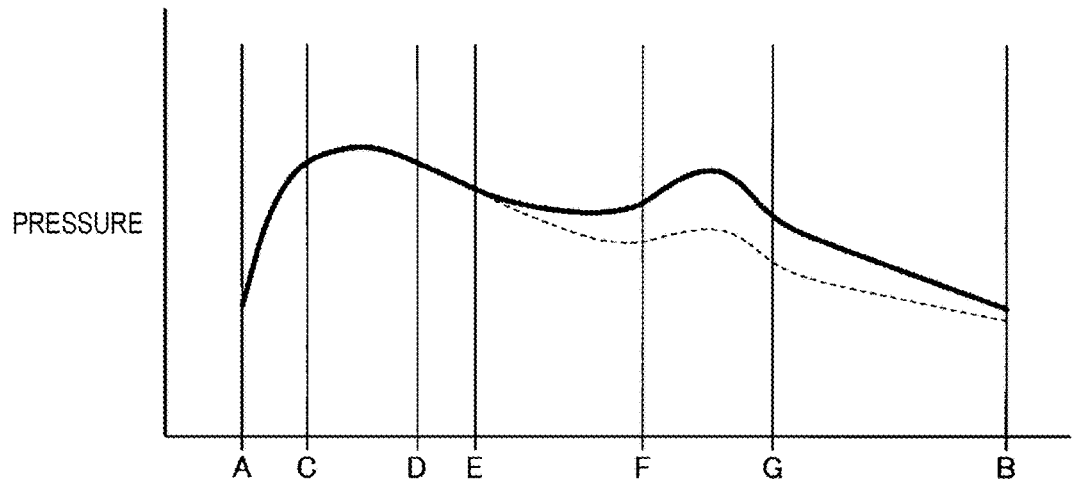
FIG. 13 is a graph showing the pressure applied to a bead portion when the pneumatic tire is assembled on a rim.

The horizontal line H is orthogonal to the tire equatorial plane CL and parallel with the tire width direction when a cut sample with a meridian cross-section is fitted to the rim width of the regular rim described below. Additionally, in FIGS. 4, 7, and 8, a range A-B is the range in which the bead portion 5 is in contact with the rim R when the pneumatic tire 1 is assembled on the rim R. Within the range A-B, position C is located inward of the end of the bead core 51 on the tire inner side in the tire radial direction; position D is located inward of the end of the bead core 51 on the tire outer side in the tire radial direction; position E is located on the horizontal line H; position F is located on the tire outer side of the outer side of the bead core 51 in the tire radial direction; and position G is an inflection point located on the tire outer side of the bead portion 5. FIG. 13 is a graph showing the pressure applied to the bead portion 5 at the positions within the range A-B when the pneumatic tire 1 is assembled on the rim R. Additionally, in FIG. 13, the solid line shows the pressure applied to the bead portion 5 when the vehicle is in a static state (when the vehicle is stopped or traveling at low speeds). The dashed line shows the pressure applied to the bead portion 5 when the vehicle is traveling at high speeds (150 km/h or greater).

As illustrated in FIG. 13, in the range between position A, which is inward of the horizontal line H in the tire radial direction, and position E, because the bead core 51 is wedged against the rim R, the contact pressure with the rim R is great, and thus contact with the rim R is ensured even when traveling at high speeds. Accordingly, by disposing the first end 11a of the electrically conductive rubber 11 inward in the tire radial direction of the horizontal line H, which is based on the inner end of the bead core 51 in the tire radial direction, electrical resistance can be efficiently reduced and good rolling resistance reduction performance and high-speed durability performance can be achieved in a compatible manner. Note that as illustrated in FIG. 13, in the range from position F to position G, contact pressure with the rim R is great when the vehicle is in a static state. However, when the vehicle is traveling at high speeds, the bead portion 5 is susceptible to displacement originating at the bead core 51, and thus the contact pressure with the rim R tends to be decreased.

As illustrated in FIG. 14, which is an enlarged view of a main part of the pneumatic tire 1 illustrated in FIGS. 1 and 2, in the pneumatic tire 1 of the present embodiment, the electrically conductive rubber 11 is preferably disposed so that, in a meridian cross-section, the second end 11b is disposed in a ±45° range with respect to a normal line N to the profile of the bead portion 5 at position P of the first end 11a.

As illustrated in FIG. 14, position P of the first end 11a is the center position of the first end 11a in terms of width in the thickness direction when a cut sample with a meridian cross-section is fitted to the rim width of the regular rim described below. The normal line N is orthogonal to a tangent line T at position P of the profile of the bead portion 5. By disposed the second end 11b in a ±45° range with respect to the normal line N, the volume of the electrically conductive rubber 11 is prevented from being too great. As a result, heat build-up is suppressed and rolling resistance reduction performance and high-speed durability performance can be maintained.

As illustrated in FIGS. 15 to 20, which are enlarged views of a main part of the pneumatic tire 1 illustrated in FIGS. 1 and 2, in the pneumatic tire 1 of the present embodiment, the electrically conductive rubber 11 preferably has widths W1, W2, W3 in the thickness direction in a meridian cross-section of from 0.5 mm to 10.0 mm. The width W1 is the maximum dimension between the first end 11a and the second end 11b of the electrically conductive rubber 11 (in embodiments with a widening electrically conductive rubber 11), or the minimum dimension therebetween (in embodiments with a narrowing electrically conductive rubber 11). The width W2 is the dimension of the first end 11a of the electrically conductive rubber 11. The width W3 is the dimension of the second end 11b of the electrically conductive rubber 11.

When the widths W1, W2, W3 of the electrically conductive rubber 11 have a minimum dimension of less than 0.5 mm, electrical resistance is low, and thus the electrical resistance reduction effect tends to be decreased. When the widths W1, W2, W3 of the electrically conductive rubber 11 have a maximum dimension of greater than 10.0 mm, the volume of the electrically conductive rubber 11 is great and thus the heat build-up is increased. As a result, rolling resistance reduction performance and high-speed durability performance tend to be decreased.

Accordingly, by the widths W1, W2, W3 of the electrically conductive rubber 11 being from 0.5 mm to 10.0 mm, good rolling resistance reduction performance, high-speed durability performance, and electrical resistance reduction performance are achieved in a compatible manner, and is thus preferable.

As illustrated in FIGS. 15 to 20, which are enlarged views of a main part of the pneumatic tire 1 illustrated in FIGS. 1 and 2, in the pneumatic tire 1 of the present embodiment, the electrically conductive rubber 11 preferably has widths W1, W2, W3 in the thickness direction in a meridian cross-section of from 0.5 mm to 6.0 mm.

When the widths W1, W2, W3 of the electrically conductive rubber 11 have a dimension of less than 0.5 mm, electrical resistance is low, and thus the electrical resistance reduction effect tends to be decreased. By the widths W1, W2, W3 of the electrically conductive rubber 11 having a dimension of 6.0 mm or less, an increase in heat build-up is suppressed by the volume of the electrically conductive rubber 11 being prevented from being too large. Accordingly, setting the widths W1, W2, W3 of the electrically conductive rubber 11 to a range of from 0.5 mm to 6.0 mm is more preferable in order to achieve good rolling resistance reduction performance, high-speed durability performance, and electrical resistance reduction performance in a compatible manner.

Figure 15:
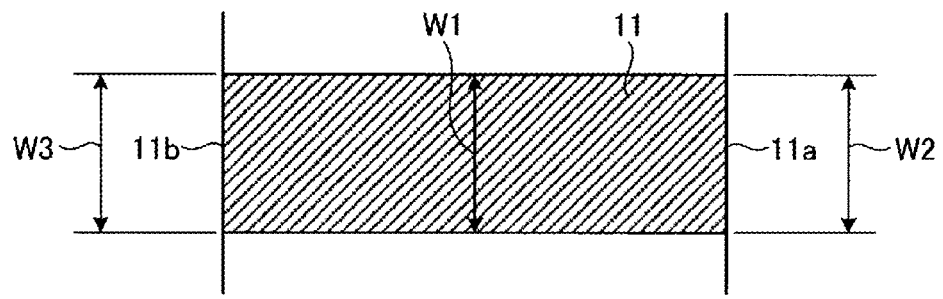
FIG. 15 is an enlarged view of a main part of the pneumatic tire illustrated in FIGS. 1 and 2.
Figure 16:
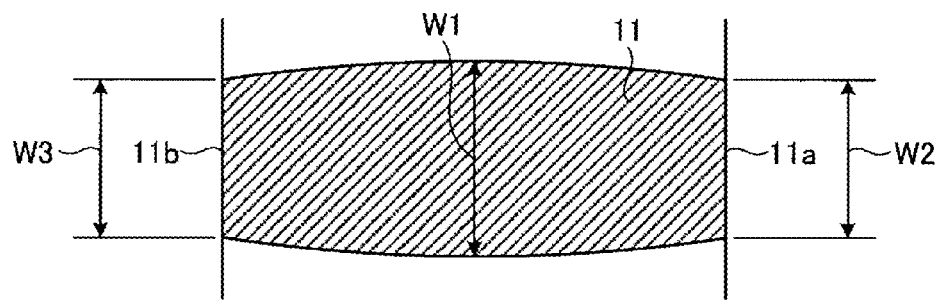
FIG. 16 is an enlarged view of a main part of the pneumatic tire illustrated in FIGS. 1 and 2.
Figure 17:
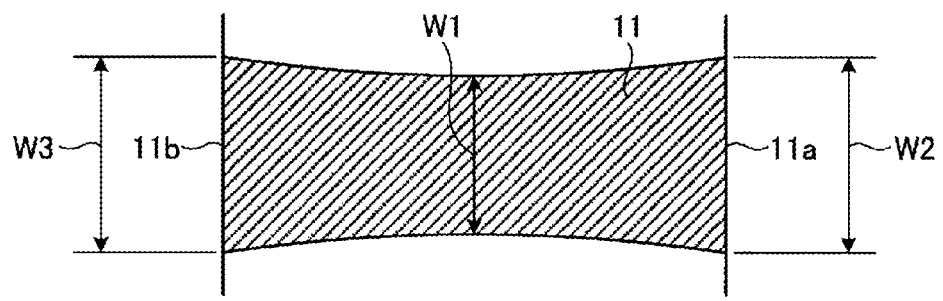
FIG. 17 is an enlarged view of a main part of the pneumatic tire illustrated in FIGS. 1 and 2.
Figure 18:
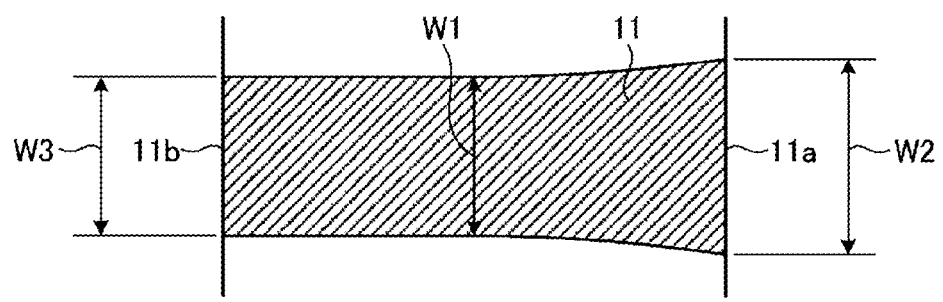
FIG. 18 is an enlarged view of a main part of the pneumatic tire illustrated in FIGS. 1 and 2.
Figure 19:
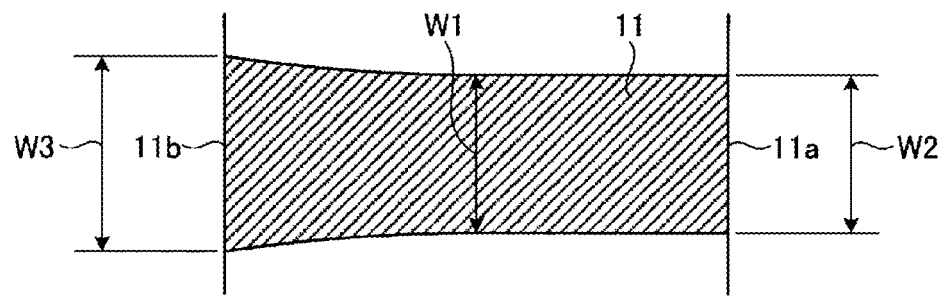
FIG. 19 is an enlarged view of a main part of the pneumatic tire illustrated in FIGS. 1 and 2.
Figure 20:
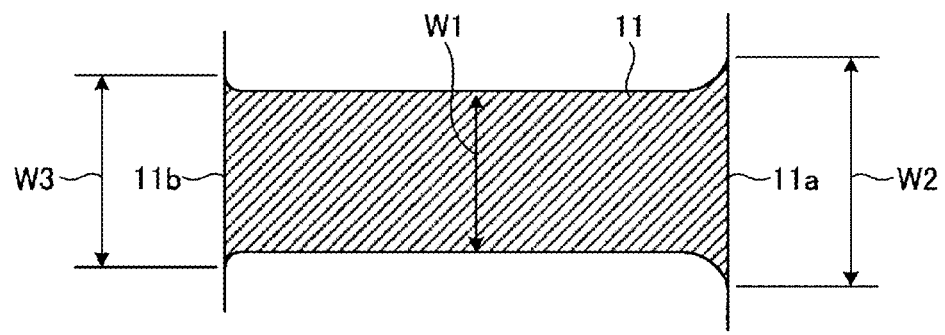
FIG. 20 is an enlarged view of a main part of the pneumatic tire illustrated in FIGS. 1 and 2.

FIG. 15 illustrates an embodiment in which the widths W1, W2, W3 of the electrically conductive rubber 11 are equal from the first end 11a to the second end 11b. FIG. 16 illustrates an embodiment in which the electrically conductive rubber 11 widens to the width W1 at a position between the first end 11a and the second end 11b. In the embodiment illustrated in FIG. 16, the width W2 of the first end 11a and the width W3 of the second end 11b should be 0.5 mm or greater and the width W1 at the widened position should be 10.0 mm or less (preferably 6.0 mm or less). In the embodiment illustrated in FIG. 16, the electrically conductive rubber 11 widens to the width W1 at a position between the first end 12a and the second end 12b. This allows electricity to flow easily and thus enables a significant electrical resistance reduction effect to be obtained. FIG. 17 illustrates an embodiment in which the width W2 of the first end 11a and the width W3 of the second end 11b are equal and greater than the width W1 at a position between the first end 11a and the second end 11b. FIG. 18 illustrates an embodiment in which the electrically conductive rubber 11 widens at the first end 11a to the width W2. FIG. 19 illustrates an embodiment in which the electrically conductive rubber 11 widens at the second end 11b to the width W3. Additionally, FIG. 20 illustrates an embodiment in which the width W2 of the first end 11a and the width W3 of the second end 11b are greater than the width W1 at a position between the first end 11a and the second end 11b, and the width W2 of the first end 11a is greater than the width W3 of the second end 11b. In the embodiments illustrated in FIGS. 17 to 20, the width W1 at a position between the first end 11a and the second end 11b should be 0.5 mm or greater, and the width W2 of the first end 11a and the width W3 of the second end 11b should be 10.0 mm or less (preferably 6.0 mm or less). In the embodiments illustrated in FIGS. 17 to 20, the width W2 of the first end 11a and the width W3 of the second end 11b of the electrically conductive rubber 11 that is in contact with the rim R side and the tire component side are greater than the width W1 at a position between the first end 11a and the second end 11b. As a result, the flow of electricity in and out is improved due to the greater contact area, and thus a significant electrical resistance reduction effect can be obtained. Furthermore, in the embodiment illustrated in FIG. 20, the width W2 of the first end 11a and the width W3 of the second end 11b are greater than the width W1 at a position between the first end 11a and the second end 11b, and the width W2 of the first end 11a is greater than the width W3 of the second end 11b. As a result, the flow of electricity in from the rim R side is improved, and thus a more significant electrical resistance reduction effect can be obtained.

According to the pneumatic tire 1 of the present embodiment, in the electrically conductive rubber 11, in a meridian cross-section, the width W2 of the first end 11a in the thickness direction is preferably greater than the maximum width W1 at a position between the first end 11a and the second end 11b. Additionally, in the electrically conductive rubber 11, in a meridian cross-section, the width W3 of the second end 11b in the thickness direction is preferably greater than the maximum width W1 at a position between the first end 11a and the second end 11b. Furthermore, in the electrically conductive rubber 11, in a meridian cross-section, the width W2 of the first end 11a in the thickness direction is preferably greater than the width W3 of the second end 11b.

In the pneumatic tire 1 of the present embodiment, the electrically conductive rubber 11 preferably has an electrical resistance value of $1 \times 10^6 \Omega$ or less.

According to this pneumatic tire 1, electricity flows easily through the electrically conductive rubber 11, and thus a significant electrical resistance reduction effect can be obtained. This allows a low heat build-up rubber with an electrical resistance value greater than $1 \times 10^6 \Omega$ to be used for the rim cushion rubber 5A, and thus rolling resistance reduction performance and high-speed durability performance can be improved.

Additionally, in the pneumatic tire 1 of the present embodiment, the electrically conductive rubber 11 is preferably disposed at a plurality of positions.

By disposing the electrically conductive rubber 11 at a plurality of positions, a significant electrical resistance reduction effect can be obtained. By disposing at least the first end 11a of the electrically conductive rubber 11 in the range from position A to position E or in the range from position F to position G where contact pressure with the rim R is comparatively great as illustrated in FIG. 13, an electrical resistance reduction effect can be obtained, and is thus preferable. In particular, it is more preferable that a plurality of the electrically conductive rubbers 11 be disposed at a plurality of positions so that at least the first ends 11a are disposed in the range from position A to position E where contact pressure with the rim R is great in order to obtain an electrical resistance reduction effect. Furthermore, by disposing a plurality of the electrically conductive rubbers 11 at a plurality of positions so that at least the first ends 11a are disposed in the range from position C to position D, which corresponds to a lower portion of the bead core 51 (inward in the tire radial direction) where contact pressure with the rim R is great, an electrical resistance reduction effect can be obtained, and is thus more even preferable.

Additionally, in the pneumatic tire 1 of the present embodiment, the second end 11b of the electrically conductive rubber 11 is preferably disposed in contact with the carcass layer 6, which is the tire component adjacent to the rim cushion rubber 5A.

According to this pneumatic tire 1, the end portions of the carcass layer 6 in the tire width direction are folded over the pair of bead cores 51 from in to out in the tire width direction, and the carcass layer 6 is stretched in a toroidal shape in the tire circumferential direction to form the framework of the tire. By disposing the second end 11b of the electrically conductive rubber 11 in contact with this carcass layer 6, electricity that enters from the rim R can be appropriately guided toward the tread portion 2, and thus an effect of significant improvement in the electrical resistance reduction performance can be obtained.

Additionally, in the pneumatic tire 1 of the present embodiment, the loss tangent tan δ at 60° C. of the coating rubber of the carcass layer 6 and the side rubber 4A of the sidewall portion 4 is preferably 0.12 or less. The electrical resistance value of the coating rubber of the carcass layer 6 and the side rubber 4A of the sidewall portion 4 is preferably $1 \times 10^7 \Omega$ or greater. Note that the loss tangent tan δ at 60° C. is measured using a sample from the pneumatic tire 1.

According to this pneumatic tire 1, by defining the coating rubber of the carcass layer 6 and the side rubber 4A of the sidewall portion 4 as described above, a low heat build-up rubber can be used as the coating rubber of the carcass layer 6 and the side rubber 4A of the sidewall portion 4. As a result, the effect of significant improvement in rolling resistance reduction performance and the high-speed durability performance can be obtained, and also an improvement in heat sag resistance performance, which is a factor in high-speed steering stability performance, can be obtained.

Additionally, in the pneumatic tire 1 of the present embodiment, the second end 11b of the electrically conductive rubber 11 is preferably disposed in contact with the innerliner layer 9, which is the tire component adjacent to the rim cushion rubber 5A.

According to this pneumatic tire 1, the innerliner layer 9 is the inner peripheral surface of the carcass layer 6. The innerliner layer 9 is layered by disposing the end portions of the innerliner layer 9 in the tire width direction at the lower portions of the bead cores 51 of the pair of bead portions 5 and stretching the innerliner layer 9 in a toroidal shape in the tire circumferential direction. By disposing the second end 11b of the electrically conductive rubber 11 in contact with the innerliner layer 9, electricity that enters from the rim R can be appropriately guided toward the tread portion 2, and thus an effect of significant improvement in electrical resistance reduction performance can be obtained. In particular, by defining the coating rubber of the carcass layer 6 and the side rubber 4A of the sidewall portion 4 as described above, a low heat build-up rubber can be used as the coating rubber of the carcass layer 6 and the side rubber 4A of the sidewall portion 4. As a result, the effect of significant improvement in rolling resistance reduction performance and the high-speed durability performance can be obtained, and by also disposing the second end 11b of the electrically conductive rubber 11 in contact with the innerliner layer 9, electricity that enters from the rim R can be appropriately guided toward the tread portion 2, and thus an effect of even more improvement in electrical resistance reduction performance can be obtained. As a result, good rolling resistance reduction performance, high-speed durability performance, and electrical resistance reduction performance can be achieved in a highly compatible manner.

EXAMPLES

In the working examples, performance tests for electrical resistance reduction performance using the tire electrical resistance value, rolling resistance reduction performance, high-speed durability performance (with a camber applied), and steering stability performance on wet road surfaces were performed on a plurality of types of different specifications (see FIG. 21).

The pneumatic tires (test tires) used in the performance tests had a tire size of 235/45R19, were assembled on a regular rim of 19×8J, and were inflated to the regular internal pressure (250 kPa).

For the evaluation of electrical resistance reduction performance, which is the tire electrical resistance value, a voltage of 1000 V was applied under conditions of 23° C. temperature and 50% humidity and the resistance value between the tread surface and the rim was measured and expressed as the electrical resistance value Ω. In the evaluation, smaller values indicate superior electrical discharge properties and superior electrical resistance reduction performance.

For the evaluation of rolling resistance reduction performance, the tires were put on an indoor drum testing machine, and the resistance at a speed of 50 km/h when loaded with 4 kN was measured. Then, the measurement results were expressed as index values with the result of the conventional example being defined as the reference (100). In the evaluation, larger index values indicate less rolling resistance and thus superior rolling resistance reduction performance.

For the evaluation of high-speed durability performance, the test tires were inflated to 120% the specified internal pressure and subjected to drying degradation for five days in an 80°-temperature environment. Thereafter, the test tires were imparted with specified internal pressure and put on a 1707 mm-diameter drum test machine with a camber applied. The test was started at a speed of 120 km/h and a load of 5 kN applied to the test tires. Every 24 hours, the speed was increased by 10 km/h until the tire failed. The distance traveled until failure was measured. The results were expressed as index values with the result of the conventional example being defined as the reference (100). In the evaluation, larger index values indicate superior high-speed durability performance.

For the evaluation of steering stability performance on wet road surfaces, the test tires were mounted to a test vehicle (four-wheeled, 2000 cc front engine front wheel drive passenger vehicle), and the test vehicle was driven on a wet road surface test course with a 3 mm layer of water. The steering characteristics when changing lanes and when cornering, as well as the stability when traveling straight were evaluated via a sensory evaluation by an experience test driver. In the sensory evaluation, the average of five evaluations was expressed as an index value with the result of the pneumatic tire of the conventional example being defined as the reference (100). In the evaluation, larger values indicate superior steering stability on wet road surfaces.

As indicated in FIG. 21, the pneumatic tire of the conventional example and the pneumatic tire of the comparative example do not include an electrically conductive rubber. The pneumatic tire of the comparative example includes an ground tread rubber that passes through a cap tread rubber and an undertread rubber of a tread portion. The ground tread rubber includes a first end and a second end of identical width. The first end is exposed on the tread surface. The second end is disposed in contact with a belt layer or a belt reinforcing layer. The pneumatic tires of Working Examples 1 to 8 include the electrically conductive rubber disposed as illustrated in FIG. 8 and the ground tread rubber that passes through the cap tread rubber and the undertread rubber of the tread portion. The ground tread rubber includes the first end and the second end with the width at the second end being greater than the width at the first end. The first end is exposed on the tread surface. The second end is disposed in contact with the belt layer or the belt reinforcing layer. In the pneumatic tires of Working Examples 2 to 8, the loss tangent tan δ at 60° C. of the cap tread rubber is 0.20 or greater, and the loss tangent tan δ at 60° C. of the undertread rubber is 0.20 or less. In the pneumatic tires of the Working Examples 4 to 8, the electrically conductive rubber has a greater loss tangent tan δ at 60° C. than the ground tread rubber. In the pneumatic tire of Working Examples 5 to 8, the electrically conductive rubber has a greater value than the ground tread rubber in terms of: carbon black (CB) volume fraction× dibutyl phthalate (DBP) oil absorption number/100.

In the pneumatic tires of Working Examples 6 to 8, the ground tread rubber is disposed on opposite sides of the tire equatorial plane in the tire width direction in a specified range.

It can be seen from the test results indicated in FIG. 21 that the pneumatic tires of Working Examples 1 to 8 have good rolling resistance reduction performance, high-speed durability performance, and electrical resistance reduction performance, which is the tire electrical resistance value, in a compatible manner. It can also be seen that the pneumatic tires of Working Examples 2 to 8 in particular have superior steering stability performance on wet road surfaces.

The invention claimed is:

1. A pneumatic tire, comprising:
 a rim cushion rubber disposed in a bead portion where the bead portion and a rim are in contact with each other when the pneumatic tire is mounted on the rim;
 an electrically conductive rubber disposed in the rim cushion rubber, the electrically conductive rubber having an electrical resistance value lower than that of the rim cushion rubber, and including
 a first end exposed on an outer surface of the rim cushion rubber in contact with the rim, and
 a second end disposed in contact with a tire component adjacent to the rim cushion rubber; and
 a ground tread rubber disposed in a tread portion passing through a cap tread rubber and an undertread rubber of the tread portion, the ground tread rubber having an electrical resistance value lower than that of the cap tread rubber, and including
 a first end exposed on a tread surface, and
 a second end disposed in contact with a belt layer or a belt reinforcing layer,
 in a meridian cross-section, a width of the second end in a thickness direction being greater than a width of the first end; wherein
 the cap tread rubber has a loss tangent tan δ at 60° C. of 0.20 or greater, and the undertread rubber has a loss tangent tan δ at 60° C. of 0.20 or less, and the electrically conductive rubber has a greater loss tangent tan δ at 60° C. than that of the ground tread rubber.

2. The pneumatic tire according to claim 1, wherein the electrically conductive rubber has a greater value than that of the ground tread rubber for: carbon black volume fraction×dibutyl phthalate oil absorption number/100.

3. The pneumatic tire according to claim 2, wherein the ground tread rubber is disposed on opposite sides of a tire equatorial plane in a tire width direction in a range starting at the tire equatorial plane which is from 0% to 50% of a ground contact width.

4. The pneumatic tire according to claim 1, wherein the ground tread rubber is disposed on opposite sides of a tire equatorial plane in a tire width direction in a range starting at the tire equatorial plane which is from 0% to 50% of a ground contact width.

\* \* \* \* \*